(12) United States Patent
Guttman et al.

(10) Patent No.: US 12,294,975 B2
(45) Date of Patent: May 6, 2025

(54) METHOD AND APPARATUS FOR PAGING MULTI-USIM UE

(71) Applicant: Samsung Electronics Co., Ltd., Gyeonggi-do (KR)

(72) Inventors: Erik Arthur Guttman, Surrey (GB); David Gutierrez Estevez, Surrey (GB); Lalith Kumar, Bengaluru (IN)

(73) Assignee: Samsung Electronics Co., Ltd (KR)

( * ) Notice: Subject to any disclaimer, the term of this patent is extended or adjusted under 35 U.S.C. 154(b) by 426 days.

(21) Appl. No.: 17/620,379

(22) PCT Filed: Aug. 6, 2020

(86) PCT No.: PCT/KR2020/010402
§ 371 (c)(1),
(2) Date: Dec. 17, 2021

(87) PCT Pub. No.: WO2021/025486
PCT Pub. Date: Feb. 11, 2021

(65) Prior Publication Data
US 2022/0248368 A1 Aug. 4, 2022

(30) Foreign Application Priority Data

Aug. 6, 2019 (IN) .............................. 201931031777
Aug. 5, 2020 (GB) ..................................... 2012159

(51) Int. Cl.
*H04W 68/00* (2009.01)
*H04W 68/02* (2009.01)
(52) U.S. Cl.
CPC ......... *H04W 68/005* (2013.01); *H04W 68/02* (2013.01)

(58) Field of Classification Search
CPC ... H04W 68/005; H04W 68/02; H04W 76/16; H04W 88/06
See application file for complete search history.

(56) References Cited

U.S. PATENT DOCUMENTS

| | | | |
|---|---|---|---|
| 9,924,491 B1* | 3/2018 | Dreiling | H04W 68/02 |
| 2005/0111395 A1 | 5/2005 | Hwang et al. | |
| 2008/0274751 A1* | 11/2008 | Tinnakornsrisuphap | H04W 48/17 455/458 |
| 2010/0098023 A1 | 4/2010 | Aghili et al. | |

(Continued)

FOREIGN PATENT DOCUMENTS

| | | |
|---|---|---|
| EP | 1821561 | 8/2007 |
| WO | WO 2016/053552 | 4/2016 |
| WO | WO 2018/145013 | 8/2018 |

OTHER PUBLICATIONS

European Search Report dated Aug. 31, 2022 issued in counterpart application No. 20849189.4-1215, 10 pages.

(Continued)

*Primary Examiner* — Mazda Sabouri
(74) *Attorney, Agent, or Firm* — The Farrell Law Firm, P.C.

(57) ABSTRACT

A method of an User Equipment (UE) is provided. The method may include receiving a paging request from a second network when the UE is active on a first network; determining if the received paging request includes information indicating the UE to service the received paging request; and servicing received the paging request based on the information included in the paging request.

11 Claims, 5 Drawing Sheets

(56) References Cited

U.S. PATENT DOCUMENTS

| | | | |
|---|---|---|---|
| 2011/0286465 A1 | 11/2011 | Koodli et al. | |
| 2012/0004004 A1 | 1/2012 | Song et al. | |
| 2016/0262159 A1* | 9/2016 | Puddle | H04W 68/02 |
| 2019/0357131 A1* | 11/2019 | Sivavakeesar | H04W 60/04 |
| 2020/0374833 A1* | 11/2020 | Guo | H04W 8/183 |
| 2020/0396591 A1* | 12/2020 | Ou | H04W 24/08 |
| 2021/0352619 A1* | 11/2021 | Ryu | H04W 68/005 |

OTHER PUBLICATIONS

International Search Report dated Nov. 6, 2020 issued in counterpart application No. PCT/KR2020/010402, 3 pages.

Written Opinion dated Nov. 6, 2020 issued in counterpart application No. PCT/KR2020/010402, 5 pages.

3GPP; TSGRAN; Mobile radio interface layer 3 specification; RRC protocol; Iu Mode (Release 15), 3GPP TS 44.118 V15.0.0, Jun. 28, 2018, 4 pages.

Intel, Verizon, AT&T, Sony, MediaTek Inc., "Paging Cause Introduction", S2-1812350, SA WG2 Meeting #129-BIS, Nov. 26-30, 2018, 8 pages.

Qualcomm Incorporated, "Establishment Cause for Voice and Video", R2-1806892, 3GPP TSG-RAN WG2 Meeting #102, May 21-25, 2018, 3 pages.

Intel Corporation, "Motivation for RAN Level Multi-Sim Support", RP-191347, 3GPP TSG RAN #84, Jun. 3-6, 2019, 7 pages.

Intel Corporation, "Intel Views on Release-17", RP-191406, 3GPP TSG RAN Meeting #84, Jun. 3-6, 2019, 36 pages.

British Examination Report dated Jan. 15, 2021 issued in counterpart application No. GB 2012159.6, 7 pages.

Jad G. Atallah et al., "Integrated Frequency Synthesis for Convergent Wireless Solutions", May 30, 2012, 2 pages.

European Search Report dated May 31, 2022 issued in counterpart application No. 20849189.4-1215, 12 pages.

EP Communication Report dated Aug. 20, 2024 issued in counterpart application No. 20849189.4-1215, 29 pages.

\* cited by examiner

[Fig. 1]
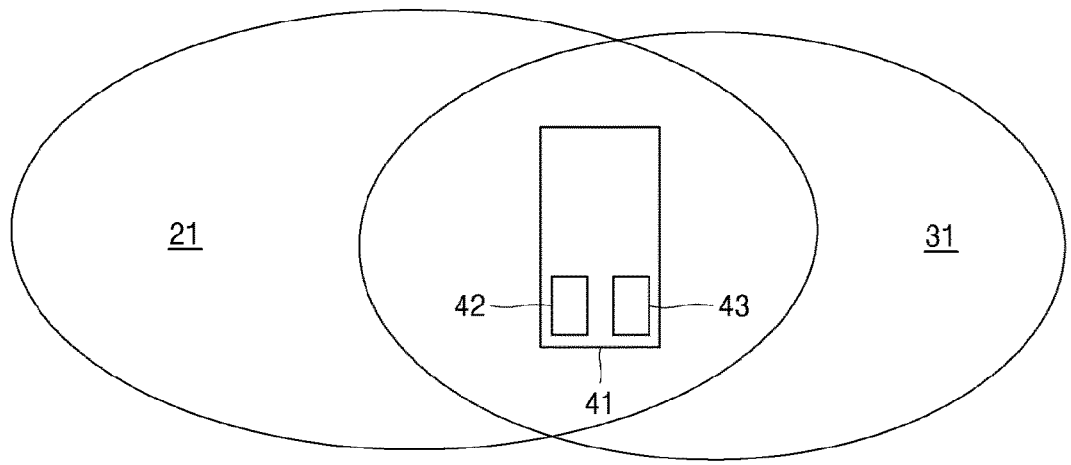
[Fig. 2]
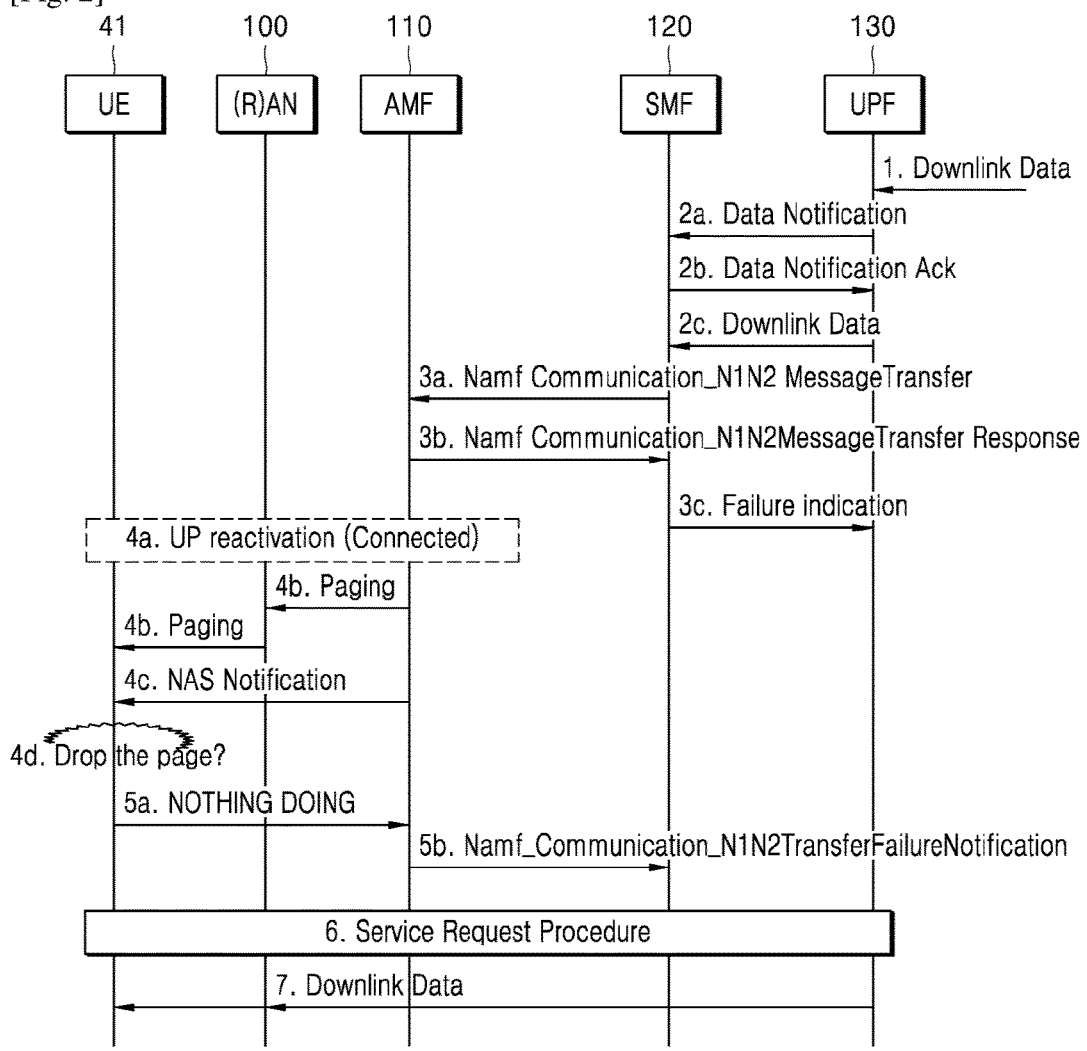

[Fig. 5]
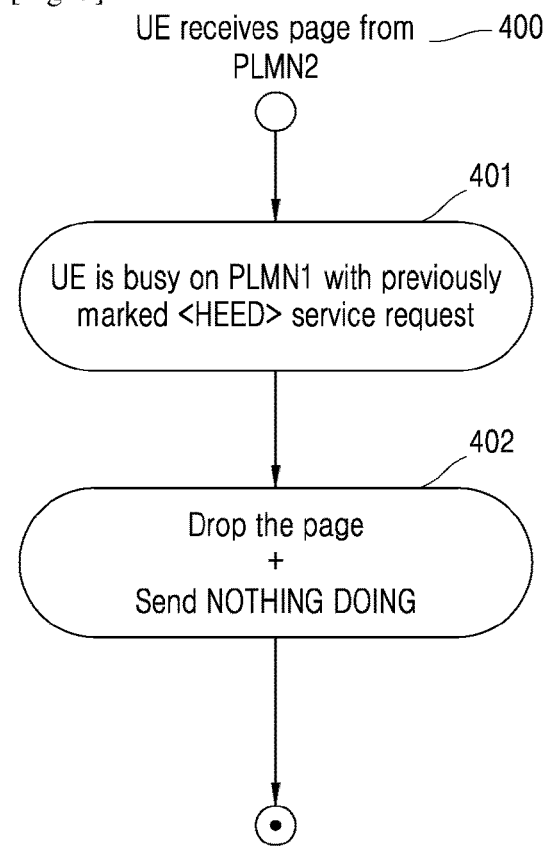
[Fig. 6]
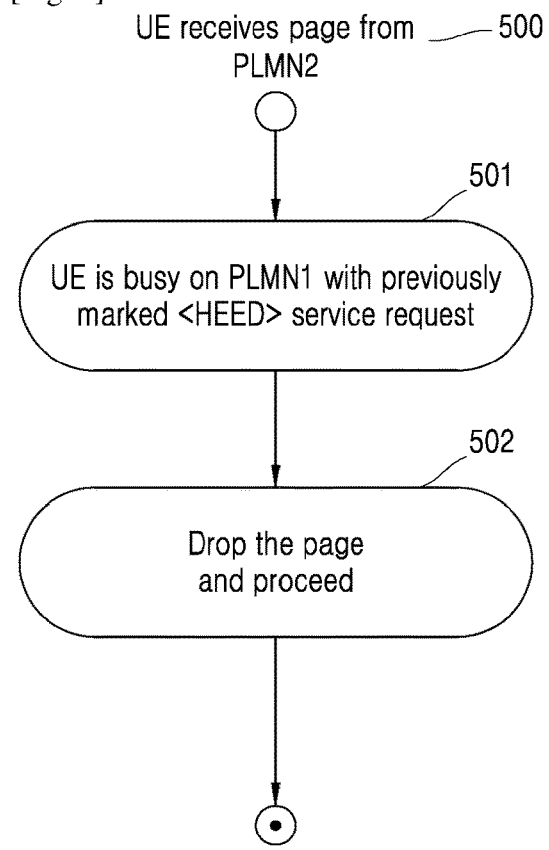

[Fig. 7]
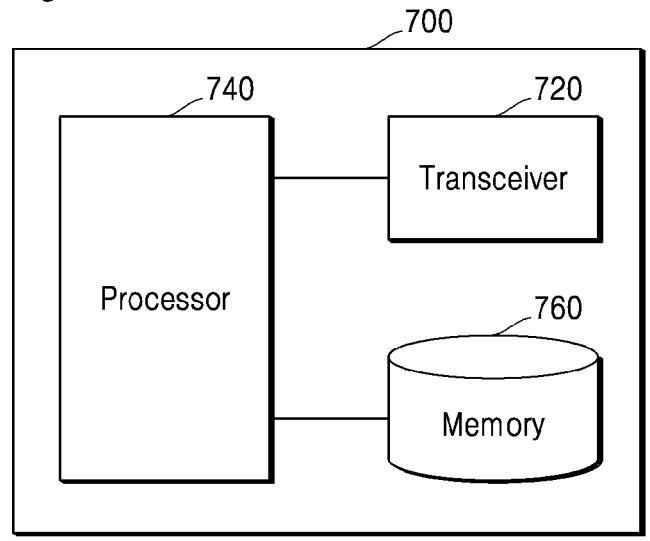
[Fig. 8]
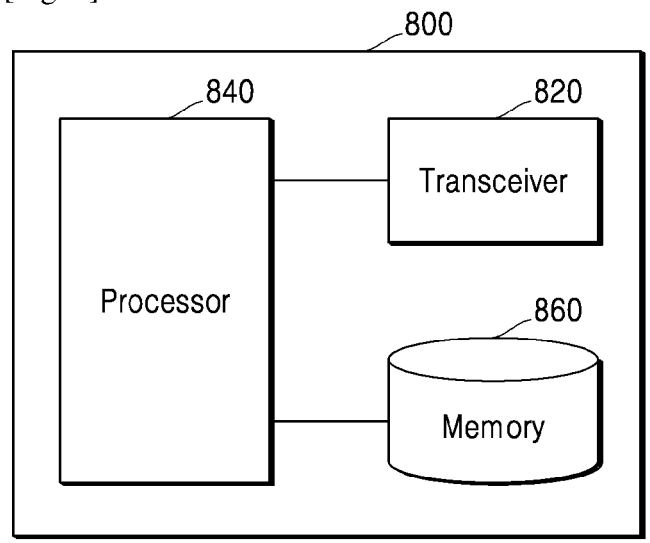
[Fig. 9]
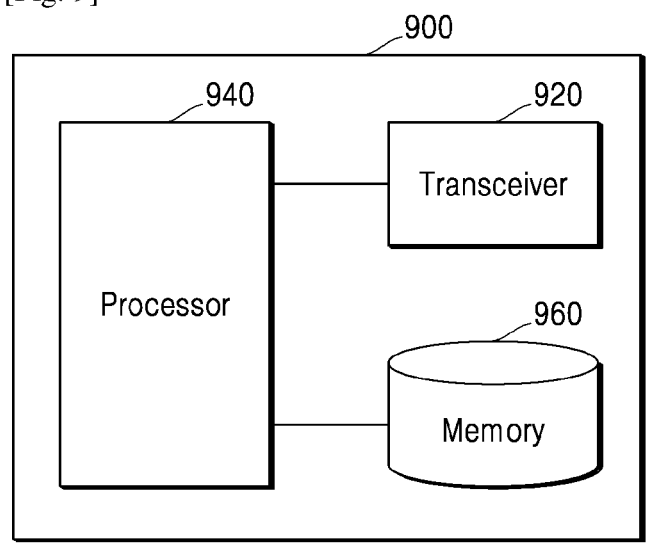

METHOD AND APPARATUS FOR PAGING MULTI-USIM UE

PRIORITY

This application is a National Phase Entry of PCT International Application No. PCT/KR2020/010402, which was filed on Aug. 6, 2020, and claims priority to Indian Patent Application number 201931031777 and Great Britain Patent Application No. 2012159.6, which were filed on Aug. 6, 2019 and Aug. 5, 2020, respectively, the entire content of each of which is incorporated herein by reference.

TECHNICAL FIELD

The present disclosure relates to improvements in the field of mobile devices or User Equipments (UEs) which support two or more Universal Subscriber Modules (USIM). The two or more USIMs may be provided from the same or different Mobile Network Operators (MNO).

BACKGROUND ART

To meet the demand due to ever-increasing wireless data traffic after the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window super-position coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things transmit, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that generate a new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

DISCLOSURE OF INVENTION

Solution to Problem

The present disclosure relates to a method and an apparatus for paging a user equipment (UE) with a paging request including information indicating the UE to service the paging request.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1 shows a MUSIM UE according to an embodiment of the disclosure;

FIG. 2 shows a message exchange according to an embodiment of the disclosure;

FIG. 5 shows a flowchart illustrating an operation according to a third embodiment of the disclosure;

FIG. 6 shows a flowchart illustrating an operation according to a fourth embodiment of the disclosure;

FIG. 7 schematically illustrates a base station according to embodiments of the present disclosure;

FIG. 8 illustrates a user equipment (UE) according to embodiments of the present disclosure; and FIG. 9 schematically illustrates a Entity according to embodiments of the present disclosure.

MODE FOR THE INVENTION

Figure 3:
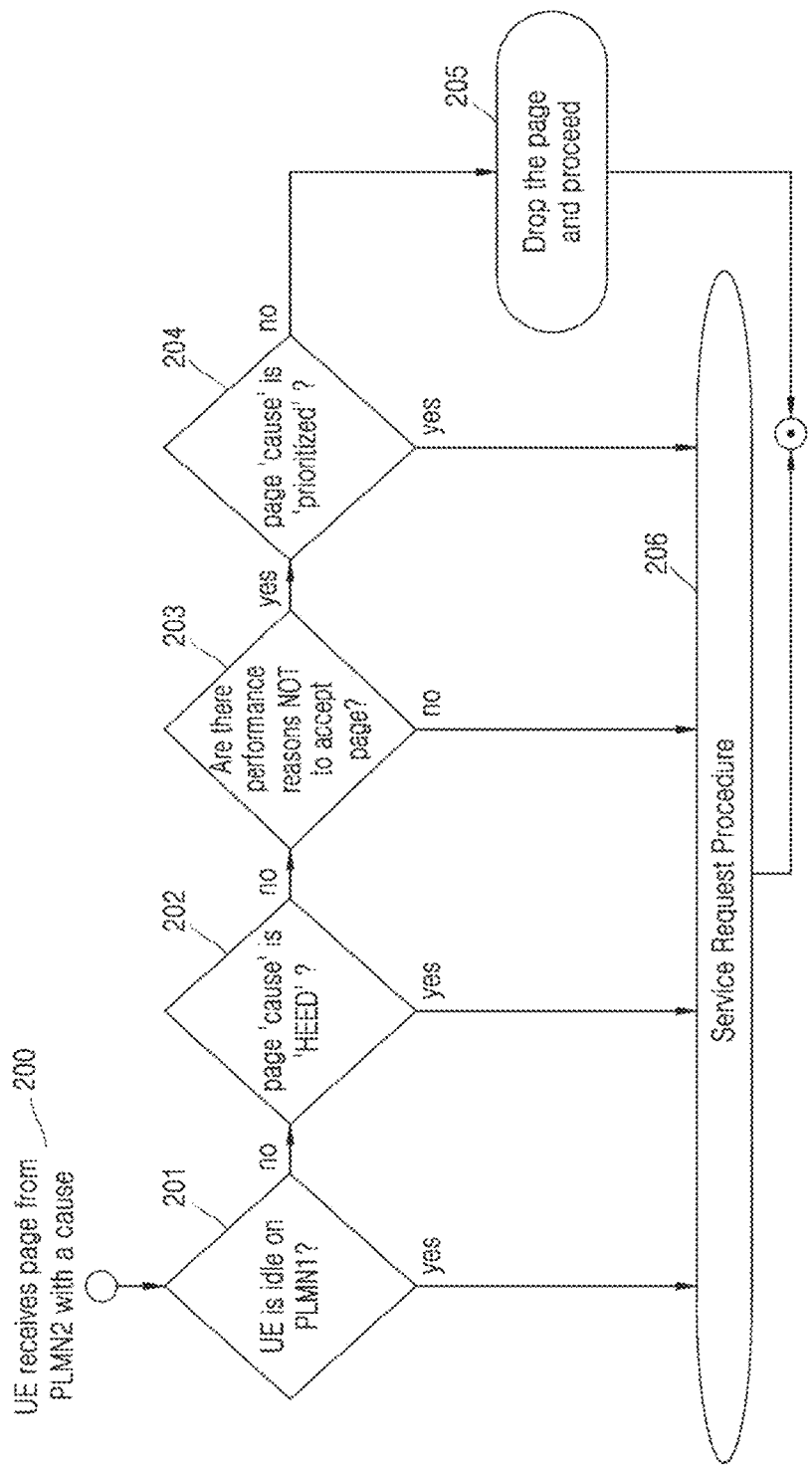
FIG. 3 shows a flowchart illustrating an operation according to a first embodiment of the disclosure.

System performance and user experience are greatly impacted in at least two areas.

Firstly, support for multi-USIM is handled in an implementation-specific manner without any support from the 3GPP standard specifications, resulting in a variety of implementations and UE behaviours. Secondly, a multi-USIM device implementation typically uses common radio and baseband components that are shared among the multiple USIMs. For example, while actively communicating with the first system/network associated with USIM A, the UE needs to occasionally check the other system/network associated with USIM B, e.g. to monitor the paging channel, perform signal measurements, or read the system information, and determine if it needs to respond to a paging request from the other system.

Embodiments of the disclosure aim to address issues associated with paging requests received by MUSIM devices. In particular, embodiments aim to focus on paging procedures that may happen with respect to a Public Land Mobile Network (PLMN) different from the one the UE is active at in that moment. Current state-of-the-art specifications force the UE to process an incoming page even if it is being active on a different PLMN.

According to the present disclosure there is provided an apparatus and method as set forth in the appended claims. Other features of the disclosure will be apparent from the dependent claims, and the description which follows.

According to a first aspect of the present disclosure, there is provided a method of operating a Multi-USIM User Equipment, UE, wherein if the UE is active on a first network and receives a paging request from a second network, the UE determines if the paging request includes an indication that it must service the paging request, and then the UE services the paging request.

In an embodiment, if the result of the determination is that the paging request does not include the indication, the UE determines if there are performance reasons not to accept the paging request and if there are no such reasons, the UE services the paging request.

In an embodiment, if the UE determines that there are performance reasons not to accept the paging request, the UE then determines if the paging cause is prioritised and if it is prioritised, the UE services the paging request.

In an embodiment, if the UE determines that the paging cause is prioritised, the UE services the paging request.

In an embodiment, if the UE determines that the paging cause is not prioritised, then the UE drops the paging request.

In an embodiment, the UE additionally informs the second network that it will not service the paging request.

In an embodiment, if the UE is active with the first network as a result of a previous paging request which included an indication that it must service the paging request, then any subsequent requests from the second network are dropped.

According to a second aspect of the present disclosure, there is provided a multi-USIM UE operable to perform the method of the first aspect.

According to a third aspect of the present disclosure, there is provided method of transmitting a paging request from a telecommunication network to a Multi-USIM User Equipment, UE, wherein the paging request includes a paging cause which indicates to the UE that it must service the paging request.

According to a fourth aspect of the present disclosure, there is provided Network apparatus arranged to perform the method of the third aspect.

Although a few preferred embodiments of the present disclosure have been shown and described, it will be appreciated by those skilled in the art that various changes and modifications might be made without departing from the scope of the invention, as defined in the appended claims.

FIG. 1 shows a Multi-USIM UE 41, having two USIMs 42, 43. The UE 41 is configured such that USIM 42 is associated with network 21 and USIM 43 is associated with network 31.

The UE is located in a position where service is possible from either or both networks 21, 31 and is operable according to one or more of the embodiments described herein.

A problem addressed by embodiments of this disclosure is the need for a multi-USIM UE to be able to ignore paging requests on a different PLMN to the one where it is actively operating, whenever suitable. Prior art standard specifications force the UE to service the page request, and only if it is determined that the service priority that the incoming page refers to is lower than the service currently being handled can the incoming page be dropped. Hence, it is currently not possible for the network to indicate to the UE that a paging message may be dropped or ignored (i.e., not 'heeded') without the need for the page to be first serviced by the UE. Embodiments of the disclosure optimize the overall network performance when multi-USIM UEs are present by increasing the efficiency of the system's ability to handle paging messages in multi-USIM devices.

A particular problem in the prior art is that multi-USIM UEs may be busy processing service requests on a different USIM and PLMN. Embodiments of the present disclosure provide a new message type ('HEED') as paging cause that indicates to the UE whether it's possible for the paging request to be ignored or not. Once the page message is received by the UE—which is a dual receiver, so it can indeed receive the page message—if the paging cause message is <HEED> then the UE must service the request, but if it is <not HEED> then it may directly drop the page request (if appropriate for any reason), and then notify the network that nothing is being done with regard to the paging request This arrangement is not known in the prior art, which merely discloses that the page needs to be serviced by the UE and only after a priority assessment has been performed may the page be dropped, with the network noticing only after a timer repeatedly expires, since no notification is sent explicitly by the UE to the Access and Mobility Management Function (AMF). Such unresponsive behaviour resembles the UE being out of coverage: the UE electively determines that it is unable to respond in order to prevent the need for communication, especially transmission, to one or more PLMNs.

Page causes are currently part of the paging messages in UTRAN (25.331, section 8.1.2.2), and codes representing the different causes are transmitted along with the message to indicate such a cause. New Radio (NR) does not include a paging cause code. Hence, a <HEED> message is encoded as a page cause, where the only purpose is to indicate to the UE the reason for the paging message.

Embodiments of the disclosure comprise the following steps:

a) HEED paging cause: the provision of a novel paging cause that the network uses when sending the page request to the UE to notify that, if needed, the UE may turn off its discretion (i.e., ignore the page request without even handling it). This particular aspect allows the rest of the Service Request procedures in the existing specification to persist unaltered.

i) whether there is any performance reason for that, and ii) the service priority list.

In addition, a further optimization may be achieved by the sending of a 'NOTHING DOING' message to the network (via the AMF), indicating that the page was ignored. This allows the network to know that the UE is not 'out of coverage' but rather in a 'suspended' state where it is actively ignoring the incoming page and so the network should not 'waste' network resources by avoiding:

i) the exchanging of messages after the timer associated with the page expires, and ii) the page retransmissions that happen according to prior art procedures when a page is not attended due to service priority reasons.

FIG. 2 shows an updated service request procedure triggered by the network. Various entities are shown, including UE 41, RAN 100, AMF 110, SMF 120 and UPF 130. The message exchanges shown here effectively replace those shown in FIG. 4.2.3.3-1 in clause 4.2.3.3 of 3GPP, "TS 23.502 Procedures for 5G System," June 2019. A key difference is that in this embodiment, the UE 41 applies a new methodology to check whether to drop the page based on the newly defined HEED message, which is part of the paging message itself specifying the paging cause. In particular, the following new or updated steps (compared to the figures referenced above) are performed within the network-triggered service request procedure:

Step 4*b*. Paging: the AMF 110 determines the page and its cause and encodes the cause in the message. <HEED> is a cause that forces the UE 41 to service the page. However, <not HEED> allows the UE 41 to ignore the page if there's a performance reason for that, which was not possible in the prior art. The RAN node 100 forwards the same paging message to the UE 41.

Step 4*d*—"Drop the page?": the UE 41 receives the page along with its cause and triggers a new methodology to check whether to drop the page based on the HEED message, namely:

If <HEED> is received, the service request procedure or any initial NAS procedure is triggered normally If <not HEED> is received, the UE checks whether there are performance reasons not to service the page and the page prioritization before triggering the service request.

Step 5*a*: this step is optional, hence two realizations of HEED are possible, namely with and without Step 5*a*. If <not HEED> has been received, the UE may proceed to drop the paging message and alert the network (via AMF 110) that it's doing nothing (i.e, not reading the mobile terminated data and processing it) with a NOTHING DOING message. This message is a further optimization according to an embodiment of the disclosure that may or may not be enabled without affecting the rest of the method.

Step 5*b*: this step is optional: if the page is dropped but Step 5*a* is not enabled, the UE may proceed normally after the page is dropped (as per the prior art). This means that no message is sent to the AMF 110, hence causing a timer to go off at the AMF and letting the paging procedure continue.

There now follows details of embodiments of the present disclosure, which utilize a HEED indication as paging cause to determine that a service request must be serviced. The embodiments differentiate themselves in the exact processing that takes place at the UE 41 after receiving such a request.

A first embodiment represents the case where the UE 41 is busy on a first network, PLMN1, processing a service request that was not marked as <HEED> and the page dropping mechanism follows the standardized procedure known in the prior art i.e. the UE 41 does not provide notification of page dropping to the network and the paging process continues after a timer at the AMF 110 expires. FIG. 3 shows a flow chart representing this embodiment.

At 200, UE 41 receives a page from a second network PLMN2. If, at 201, the UE 41 is idle on the first network PLMN1, then flow continues to the service request procedure 206. However, if the UE is not idle on PLMN1 i.e. it is active, then a check is made at 202 if the page cause is <HEED>. If it is, then flow continues to 206, since the UE is forced to react. However, if the page cause is <NOT HEED>, then at 203 a check is made to determine if there are any performance reasons not to accept the page. If there are none, flow continues to 206. If, however, there are, then at 204 a check is made to determine if the page cause is prioritised. If it is, then flow continues to 206. If not, the page is dropped at 205 and the prior art process is continued as set out above.

Figure 4:
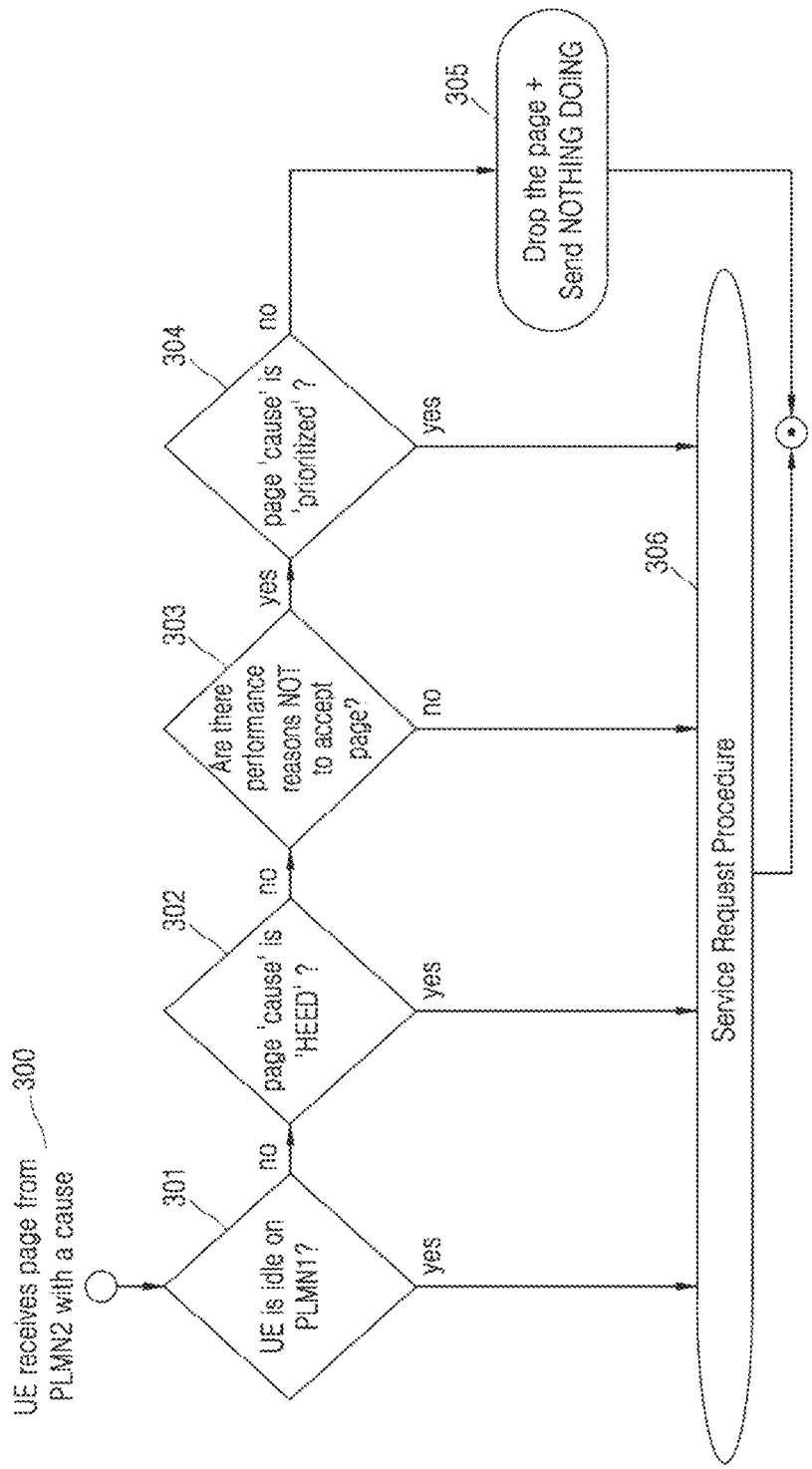
FIG. 4 shows a flowchart illustrating an operation according to a second embodiment of the disclosure.

FIG. 4 represents a different scenario, where the UE 41 is busy on PLMN1 processing a service request that was not marked as <HEED>, and the page dropping mechanism follows a different path, namely the previously mentioned additional is enabled, whereby a NOTHING DOING message is sent by the UE 41 to the AMF 110 indicating to the network that the page has been dropped. This saves transmission resources in the network by preventing the rest of the prior art paging process from continuing.

At 300, UE 41 receives a page from a second network PLMN2. If, at 301, the UE 41 is idle on the first network PLMN1, then flow continues to the service request procedure 306. However, if the UE is not idle on PLMN1 i.e. it is active, then a check is made at 302 if the page cause is <HEED>. If it is, then flow continues to 306, since the UE is forced to react. However, if the page cause is <NOT HEED>, then at 303 a check is made to determine if there are any performance reasons not to accept the page. If there are none, flow continues to 306. If, however, there are, then at 304 a check is made to determine if the page cause is prioritised. If it is, then flow continues to 306. If not, the page is dropped at 305 and the NOTHING DOING message is sent to the AMF to indicate that the page in question has been dropped.

FIG. 5 represents a case where the UE 41 is busy on PLMN1, 401, processing a service request that was marked as <HEED> and a paging request arrives, 400, from PLMN2 (with or without a cause). In this case no further checks are needed and the page is dropped, 402. A NOTHING DOING message is sent by the UE to the AMF indicating to the network that the page has been dropped.

FIG. 6 represents a case where the UE 41 is busy on PLMN1, 501, processing a service request that was marked as <HEED> and a paging request arrives, 500, from PLMN2 (with or without a cause). In this case no further checks are needed, and the page is dropped 502. The page dropping mechanism follows the procedure known in the prior art and referred to previously.

Further, the HEED cause may be provided to the MUSIM UE 41 by PLMN1 (of say SIM-1) when a highest priority service data or signalling (for example emergency or mission critical service) is pending to be delivered to the UE 41. The UE 41 will immediately respond with an initial NAS message unless the UE is also executing a similar highest priority service on PLMN2 (of say SIM-2) i.e. the same category of service. In such a collision case, where there is no obvious solution, the UE 41 may make a choice whether to respond to paging message with HEED cause indication. Such a decision may be implementation specific and does not need to be a standardisation issue.

In embodiments of the disclosure, the trigger from the UE 41 in response to a paging message is illustrated as a Service request procedure, however this can be any initial direct transfer message as shown in, for instance, prior art specification 3GPP TS 24.501 "example registration procedure" or "detach procedure".

Embodiments of the disclosure provide an improved UE able to better handle paging requests due to the adaptation provided herein. Network resources are better utilised by preventing unnecessary interactions between network entities.

FIG. 7 is a block diagram illustrating a base station according to an exemplary embodiment of the present disclosure.

Referring to the FIG. 7, the base station 700 may include a processor 710, a transceiver 720 and a memory 730. However, all of the illustrated components are not essential. The base station 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the base station 700 may be implemented by the processor 710.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the base station 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

FIG. 8 illustrates a user equipment (UE) according to embodiments of the present disclosure.

The multi-USIM UE described above may correspond to the UE 800.

Referring to the FIG. 8, the UE 800 may include a processor 810, a transceiver 820 and a memory 830. However, all of the illustrated components are not essential. The UE 900 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the UE 800 may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the UE 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

FIG. 9 schematically illustrates a core network entity according to embodiments of the present disclosure.

The AMF described above may correspond to the core network entity 900.

Referring to the FIG. 9, the core network entity 900 may include a processor 910, a transceiver 920 and a memory 930. However, all of the illustrated components are not essential. The core network entity 900 may be implemented by more or less components than those illustrated in FIG. 9. In addition, the processor 910 and the transceiver 920 and the memory 930 may be implemented as a single chip according to another embodiment.

The aforementioned components will now be described in detail.

The transceiver 920 may provide an interface for performing communication with other devices in a network. That is, the transceiver 920 may convert a bitstream transmitted from the core network entity 900 to other devices to a physical signal and covert a physical signal received from other devices to a bitstream. That is, the transceiver 920 may transmit and receive a signal. The transceiver 920 may be referred to as modem, transmitter, receiver, communication unit and communication module. The transceiver 920 may enable the core network entity 900 to communicate with other devices or system through backhaul connection or other connection method.

The memory 930 may store a basic program, an application program, configuration information for an operation of the core network entity 900. The memory 930 may include volatile memory, non-volatile memory and a combination of the volatile memory and the non-volatile memory. The memory 930 may provide data according to a request from the processor 910.

The processor 910 may control overall operations of the core network entity 900. For example, the processor 910 may transmit and receive a signal through the transceiver 920. The processor 910 may include at least one processor. The processor 910 may control the core network entity 900 to perform operations according to embodiments of the present disclosure.

According to an embodiment of the present disclosure, a method of an User

Equipment (UE) in a wireless communication system is provided. The method may comprise: receiving a paging request from a second network when the UE is active on a first network; determining if the received paging request includes information indicating the UE to service the received paging request; and servicing the received paging request based on the information included in the paging request.

In an embodiment, the method may further comprise: determining if performance reasons not to accept the paging request exist, in case that the paging request does not include the information; and servicing the paging request in case that the performance reasons do not exist.

In an embodiment, the method may further comprise: determining if a paging cause is prioritised in case that the performance reasons exist; and servicing the paging request in case that the paging cause is prioritised.

In an embodiment, the method may further comprise dropping the paging request in case that the paging cause is not prioritised.

In an embodiment, the method may further comprise informing the second network that the UE will not service the paging request in case that the paging request is dropped.

In an embodiment, if the UE is active with the first network as a result of a previous paging request indicating the UE to service the previous paging request, any subsequent requests from the second network are dropped.

According to an embodiment of the present disclosure, an User Equipment (UE) in a wireless communication system is provided. The UE may comprise: a transceiver; and at least one processor coupled with the transceiver and configured to: receive, via the transceiver, a paging request from a second network when the UE is active on a first network; determine if the received paging request includes information indicating the UE to service the received paging request; and service the received paging request based on the information included in the paging request.

In an embodiment, the at least one processor is further configured to: determine if performance reasons not to accept the paging request exist, in case that the paging request does not include the information; and service the paging request in case that the performance reasons do not exist.

In an embodiment, the at least one processor is further configured to: determine if a paging cause is prioritised in case that the performance reasons exist; and service the paging request in case that the paging cause is prioritised.

In an embodiment, the at least one processor is further configured to drop the paging request in case that the paging cause is not prioritised.

In an embodiment, the at least one processor is further configured to inform the second network that the UE will not service the paging request in case that the paging request is dropped.

In an embodiment, if the UE is active with the first network as a result of a previous paging request including an indication that the UE must service the paging request, then any subsequent requests from the second network are dropped.

According to an embodiment of the present disclosure, a method of an Access and

Mobility Management Function (AMF) in a wireless communication system is provided. The method may comprise transmitting a paging request including a paging cause indicating an User Equipment (UE) to service the transmitted paging request.

In an embodiment, the method may further comprise receiving, from the UE, a message including information that the transmitted paging request is not serviced by the UE.

According to an embodiment of the present disclosure, an Access and Mobility

Management Function (AMF) in a wireless communication system is provided. The AMF may comprise a transceiver; and at least one processor configure to transmit a paging request including a paging cause which indicates to an User Equipment (UE) that the UE must service the paging request.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE) in a wireless communication system, the method comprising:
receiving, from an access and mobility management function (AMF) entity, a paging request associated with a second network, the UE being in an active state on a first network;
identifying whether the paging request includes a first paging cause that forces the UE to service the paging request or a second paging cause indicating that the UE is allowed to drop the paging request;

in case that the paging request includes the first paging cause, transmitting, to the AMF entity, a service request message;

in case that the paging request includes the second paging cause, identifying whether performance reasons not to accept the paging request exist; and in case that the performance reasons not to accept the paging request do not exist, transmitting, to the AMF entity, a service request message.

2. The method of claim 1, further comprising:

in case that the performance reasons not to accept the paging request exist, identifying whether the second paging cause is prioritized; and in case that the second paging cause is prioritized, transmitting, to the AMF entity, a service request message.

3. The method of claim 2, further comprising:

in case that the second paging cause is not prioritized, dropping the paging request.

4. The method of claim 1, further comprising:

in case that the paging request is dropped, transmitting, to the AMF entity, information indicating that the paging request is not serviced by the UE.

5. The method of claim 1, wherein in case that the UE is active with the first network as a result of a previous paging request, any subsequent request from the second network is dropped.

6. A method performed by an access and mobility management function (AMF) entity in a wireless communication system, the method comprising:

transmitting, to a user equipment (UE), a paging request associated with a second network, the UE being in an active state on a first network, wherein the paging request includes a first paging cause that forces the UE to service the paging request or a second paging cause indicating that the UE is allowed to drop the paging request;

in case that the paging request includes the first paging cause, receiving, from the UE, a service request message; and in case that the paging request includes the second paging cause, and that performance reasons not to accept the paging request do not exist, receiving, from the UE, a service request message.

7. The method of claim 6, further comprising:

in case that the paging request includes the second paging cause, the performance reasons not to accept the paging request exist, and the second paging cause is prioritized, receiving, from the UE, a service request message.

8. The method of claim 6, wherein the second paging cause which is not prioritized is associated with dropping of the paging request in case that the second paging cause is included in the paging request and the performance reasons not to accept the paging request exist.

9. The method of claim 6, further comprising:

in case that the paging request is dropped, receiving, from the UE, information indicating that the paging request is not serviced by the UE.

10. A user equipment (UE) in a wireless communication system, the UE comprising:

a transceiver; and at least one processor coupled with the transceiver and configured to:

receive, from an access and mobility management function (AMF) entity, a paging request associated with a second network, the UE being in an active state on a first network;

identify whether the paging request includes a first paging cause that forces the UE to service the paging request or a second paging cause indicating that the UE is allowed to drop the paging request;

in case that the paging request includes the first paging cause, transmit, to the AMF entity, a service request message;

in case that the paging request includes the second paging cause, identify whether performance reasons not to accept the paging request exist; and in case that the performance reasons not to accept the paging request do not exist, transmit, to the AMF entity, a service request message.

11. An access and mobility management function (AMF) entity in a wireless communication system, the AMF entity comprising:

a transceiver; and at least one processor coupled with the transceiver and configured to:

transmit, to a user equipment (UE), a paging request associated with a second network, the UE being in an active state on a first network, wherein the paging request includes a first paging cause that forces the UE to service the paging request or a second paging cause indicating that the UE is allowed to drop the paging request;

in case that the paging request includes the first paging cause, receive, from the UE, a service request message; and in case that the paging request includes the second paging cause, and that performance reasons not to accept the paging request do not exist, receive, from the UE, a service request message.

* * * * *